United States Patent

Mishima et al.

[11] Patent Number: 5,928,719
[45] Date of Patent: Jul. 27, 1999

[54] SURFACE PROCESSING METHOD BY BLOWING SUBMICRON PARTICLES

[75] Inventors: Akio Mishima, Kanagawa; Naoto Kojima, Miyagi, both of Japan

[73] Assignee: Sony Corporation, Tokyo, Japan

[21] Appl. No.: 07/962,035

[22] Filed: Oct. 15, 1992

Related U.S. Application Data

[63] Continuation of application No. 07/651,610, Feb. 6, 1991, abandoned.

[30] Foreign Application Priority Data

Feb. 6, 1990 [JP] Japan ............................ 2-26860

[51] Int. Cl.⁶ ........................................................ B05D 1/12
[52] U.S. Cl. ............................ 427/180; 427/421; 427/427
[58] Field of Search .................................... 427/180, 421, 427/427

[56] References Cited

U.S. PATENT DOCUMENTS

| | | | |
|---|---|---|---|
| 4,020,535 | 5/1977 | Cuneo et al. | 51/319 |
| 4,051,275 | 9/1977 | Forestek | 427/180 |
| 4,201,799 | 5/1980 | Stephens | 427/421 |
| 4,370,538 | 1/1983 | Browning | 239/13 |
| 4,397,671 | 8/1983 | Vong | 427/180 |
| 4,741,130 | 5/1988 | Tano et al. | 51/319 |
| 4,824,695 | 4/1989 | Coulon et al. | 427/180 |
| 5,056,457 | 10/1991 | Harada | 118/419 |

FOREIGN PATENT DOCUMENTS

| | | |
|---|---|---|
| 20 62 905 | 6/1972 | Germany . |
| 64-34670 | 2/1989 | Japan . |

*Primary Examiner*—Benjamin Utech
*Attorney, Agent, or Firm*—Hill & Simpson

[57] ABSTRACT

A surface processing method by blowing submicron particles is disclosed, in which submicron particles are blown against a surface of a work to deposit a layer of the material of the particles on a surface of the work, or etching the surface of the work.

The processing method uses blowing air stream containing submicron particles having average particles size ranging between 0.01 and 3.0 μm. The deposition or etching is effected depending on an incident angle of the particles to the surface of work. According to the method deposition of the material can be effected with very high deposition rate and in case of etching very smooth etched surface is obtained.

3 Claims, 6 Drawing Sheets

SURFACE PROCESSING METHOD BY BLOWING SUBMICRON PARTICLES

This continuation of application Ser. No. 07/651,610, filed Feb. 6, 1991, now abandoned.

BACKGROUND OF THE INVENTION

The present invention relates to a surface processing method for etching the surface of a work, such as a glass substrate or a semiconductor substrate, or for depositing a film of a material over the surface of a work and, more specifically, to a novel surface processing method employing submicron particles.

The fabrication of a functional element, such as a semiconductor integrated circuit chip, a printed circuit board or a magnetic head, requires various minute processing techniques such as advanced etching techniques or thin film forming techniques.

Under such circumstances, researches have been conducted in various fields and there have been developed advanced processing techniques employing a resist mask for etching the surface of a semiconductor wafer, such as an ion beam etching method (IBE) using electrically accelerated argon ions for physically etching the surface of a work and a reactive ion etching method (RIE) using activated fluorine or chlorine gas for physically and chemically etching the surface of a work.

The processing rates of those etching methods are relatively low, need an expensive apparatus and requires troublesome work for the maintenance of the apparatus.

A noteworthy sandblasting method in which grit is blown together with compressed air is proposed, for example, in Japanese Patent Laid-open No. 64-34670.

This sandblasting method is capable of processing the surface of a work at a relatively high processing rate and is advantageous in plant and equipment investment, however, the sandblasting method is unsatisfactory when applied to processing the surface of a semiconductor wafer in patterning accuracy and the surface condition of the processed surface because the particle size of the particles employed in the sandblasting method at the minimum is on the order of 16 $\mu$m.

Those previously proposed various etching methods are unsatisfactory in either processing rate or processing accuracy, and the improvement of those etching methods has been desired.

A sputtering process, a flame spraying process and a chemical vapor deposition process (CVD) are known thin film forming techniques.

The sputtering process ejects atoms of a target from the target by bombarding the surface of the target in a vacuum with accelerated ions of an inert gas, such as Ar gas, to make the ejected atoms deposit over the surface of a substrate in a thin film. The density of the thin film thus formed by the sputtering process is quite satisfactory. However, the deposition rate of the sputtering process is low, for example, on the order of 0.006 $\mu$m/min in depositing a thin film of alumina, the sputtering process needs a high vacuum and an expensive apparatus, and the substrate is heated to a relatively high temperature during the sputtering process.

The flame spraying process melts a powder material, such as a ceramic powder, for forming a film under the atmospheric pressure or a reduced pressure by the heat of a plasma or a burner, and then sprays the melted material over a substrate to form a film. Although the flame spraying process is featured by its high deposition rate, the flame spraying process forms many voids in the film, and the flame spraying process is applicable only to forming a film on a heat-resistant substrate because the surface of the substrate is heated at a considerably high temperature.

The chemical vapor deposition process makes source gases interact by the heat of a plasma to deposit a thin film of a reaction product over a substrate. The chemical vapor deposition process, similarly to the sputtering process, is capable of forming a very dense film. However, the chemical vapor deposition process forms a film at a relatively low deposition rate and requires a space of a high vacuum, which is disadvantageous in respect of plant and equipment investment. Furthermore, since the substrate is heated to a temperature in the range of 250 to 600° C., the chemical vapor deposition process is applicable only to forming a film on a heat-resistant substrate.

Thus, the conventional film forming techniques are unsatisfactory in processing speed and subject to restrictions on the substrate on which a film is to be formed. Accordingly, fundamental improvement in the conventional film forming techniques has been desired.

As stated above, the conventional techniques for etching and deposition need a number of improvements concerning processing speed, processing accuracy, manufacturing cost and maintenance, and the development of a new processing technique has been anticipated.

OBJECT AND SUMMARY OF THE INVENTION

The present invention has been made in view of such circumstances and it is therefore an object of the present invention to provide a surface processing method exceeding the conventional techniques in processing speed and processing accuracy.

It is an object of the present invention to provide a novel surface processing method capable of depositing a film at a high deposition rate and requiring less restrictions on the surface condition of a work or workpiece.

Another object of the present invention is to provide a surface processing method capable of accurately etching the surface of a work or workpiece substantially in a mirror-finished surface to form a minute pattern at a high etching rate.

The present invention is intended to carry out efficiently the minute processing of the surface of a work or workpiece by blowing submicron particles of an average particle size in the range of 0.01 to 3 $\mu$m against the surface of the work or workpiece.

Depending on an incident angle of the particles against the surface of the work or workpiece, etching of the surface or deposition of the material on the surface of the work is effected.

DESCRIPTION OF THE PREFERRED EMBODIMENTS

Figure 1:
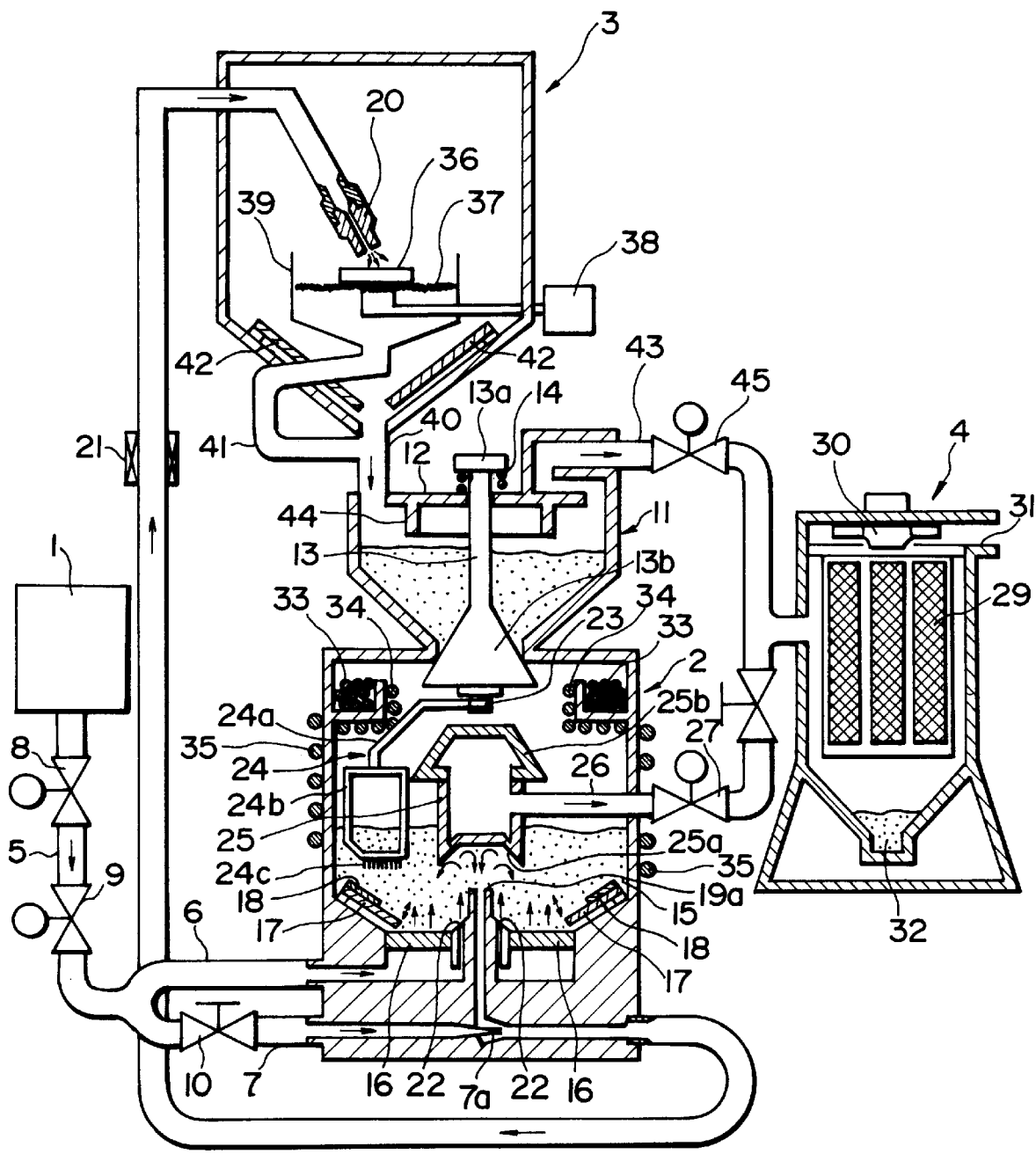
FIG. 1 is a schematic sectional view of a surface processing apparatus.

After years of zealous studies, the inventors of the present invention found that the surface of a work can be processed by submicron particles blown against the surface, which is different from that of the conventional processing techniques.

The present invention has been made on the basis of such knowledge and is featured by blowing a powder containing submicron particles of an average particle size in the range of 0.01 to 3 μm as a principal component. The present invention is featured also by blowing the powder against the surface of a work to deposit the powder on the surface so that the angle between the line of motion of the incident particles and the perpendicular to the surface at the point of incidence of the particles is in the range of 0 to 10° or by blowing the powder against the surface of a work to etch the surface so that the angle between the line of motion of the incident particles and the perpendicular to the surface at the point of incidence of the particles is in the range of 40 to 90°.

The use of the submicron particles of an average particle size in the range of 0.01 to 3 μm is the most significant feature of the present invention.

The use of such submicron particles creates a phenomenon which has never been known; for example, blowing the submicron particles against the surface so that the submicron particles fall on the surface of a work along a line of motion inclined at an angle in the range of 0 to 10° to the perpendicular to the surface at the point of incidence of the submicron particles deposits a thin film of the submicron particles over the surface, and blowing the submicron particles against the surface so that the submicron particles fall on the surface of a work along a line of motion inclined at an angle in the range of 40 to 90° to the perpendicular to the surface at the point of impact of the submicron particles etches the surface. When the submicron particles are blown against the surface so that the submicron particles fall on the surface along a line of motion inclined at an angle in the range of 10 to 40° to the perpendicular to the surface at the point of impact of the submicron particles, both the etching of the surface by the submicron particles and the deposition of the submicron particles occur competitively.

The deposition of a thin film of the submicron particles has never been experienced by the conventional sandblasting process and is a phenomenon peculiar to the use of the submicron particles. This phenomenon forms a very dense thin film at a very high film forming rate.

On the other hand, the etching function of the submicron particles is entirely different from that of the conventional sandblasting. For example, the submicron particles achieve minute processing of an accuracy on the order of several micrometers, which is essential to the semiconductor device manufacturing process, at a high rate without requiring a high vacuum and is capable of forming a mirror-finished surface. The surface roughness of the surface finished by such an etching action of the submicron particles is in the range of 1/10 to 1/20 of the average particle size of the submicron particles. Such a roughness is small enough for semiconductor device manufacturing process.

Fine particles of an average particle size exceeding 3 μm are unable to be deposited, and the smoothness of the surface etched by such fine particles and the accuracy of a pattern formed by using such fine particles are unsatisfactory. When the average particle size of the submicron particles is less than 0.01 μm, the influence of gravity on the movement of the submicron particles diminishes to a very low extent and the movement of the submicron particles is dominated by the influence of air, so that the submicron particles perform the Brownian movement in the atmosphere. Accordingly, submicron particles of an average particle size less than 0.01 μm blown against a surface in the atmosphere are unable to etch the surface and unable to be deposited over the surface due to the dominant decelerating effect of air on the movement of the submicron particles.

Preferably, the hardness (for example, the Vickers hardness) of the submicron particles employed in the present invention is higher than that of the work. Submicron particles of a hardness lower than that of the work are, as a matter of course, unable to etch the surface of the work and, moreover, unable to bite sufficiently into the surface of the work. Therefore, a thin film formed of such submicron particles are liable to come off the surface of the work and hence it is difficult to deposit such submicron particles in a thick film. Since the measurement of the hardness of submicron particles is difficult, the hardness of the submicron particles is represented by the hardness of the base material of the submicron particles. The hardness of the base material is compared with that of the work.

Submicron particles having sharp edges are preferred instead of spherical submicron particles. Submicron particles having sharp edges are preferable particularly in depositing a thin film of the same because the sharp edges of the submicron particles bite into the surface of the work for efficient deposition. When such submicron particles are used for etching, the sharp edges chip off the surface of a work efficiently. Thus, submicron particles prepared by crushing are preferable.

Although the present invention may employ submicron particles of any material meeting the foregoing requirements, in forming a thin film by deposition, in particular, the material of submicron particles must be selected according to the quality of the desired thin film.

Possible materials of submicron particles are: ceramics including alumina, glass, silicon dioxide ($SiO_2$), silicon carbide (SiC) and boron carbide (BC), metals including Cu, Au, Ti, Ni, Cr and Fe, electrically conductive materials such as carbon, and magnetic materials such as iron oxide.

For etching, in particular, particles of a relatively large particle size, for example, on the order of 5 μm, softer than the work and coated with the aforesaid submicron particles may be used. Such particles having a relatively large particle size may be obtained, for example, by an electrostatic method. Concretely, alumina submicron particles of an average particle size of 0.6 μm charged in positive can be attached electrostatically to the surfaces of glass particles of an average particle size of 5 μm charged in negative.

The submicron particles are blown together with air against the surface of a work preferably at a velocity not lower than 50 m/sec. Submicron particles blown at an excessively low velocity are unable to be deposited and unable to etch the surface of a work. Practically, the velocity is not lower than 50 m/sec.

The present invention is applicable to processing the surface of any work other than elastic works. Objective works are, for example, ferrite substrates, ceramic substrates, glass substrates and resin substrates.

When a power containing submicron particles of an average particle size in the range of 0.01 to 3 $\mu$m as principal component is blown against the surface of a work along a line of motion inclined at an angle in the range of 0 to 10° to the perpendicular to surface at the point of incidence of the submicron particles, a thin film of the submicron particles is deposited, the surface is etched by the submicron particles when the angle is in the range of 40 to 90°, and the etching of the surface by the submicron particles and the deposition of the submicron particles over the surface occur competitively when the angle is in the range of 10 to 40°.

The deposition of the blown submicron particles over the surface is a phenomenon which has never been experienced. This phenomenon is inferred to occur on the basis of the following principle.

Upon the impingement of the submicron particles blown at a high velocity on the surface of a work, the kinetic energy of the submicron particles is converted into thermal energy, heating the submicron particles locally to a very high temperature and, consequently, the submicron particles are melted partially and adhere to the surface of the work. At the next moment, the following submicron particles impinge against the submicron particles adhering to the surface of the work and are caused to adhere to the submicron particles adhering to the surface of the work by the same effect of the conversion of the kinetic energy of the submicron particles into thermal energy. This effect is repeated to form a dense film of grains of small grain sizes.

The etching effect of the submicron particles is considered to be the same as that of sandblasting. However, the etching effect of the submicron particles of very small particle sizes is different in quality from that of sandblasting.

The etching effect of the submicron particles enables the minute processing of the surface of a work in an accuracy on the order of several micrometers and finishes the surface in a mirror-finished surface. For example, the surface roughness of the surface etched by the submicron particles is in the range of $\frac{1}{10}$ to $\frac{1}{20}$ of the average particle size of the submicron particles used for etching.

Preferred embodiments of the present invention will be described hereinafter with reference to the accompanying drawings.

A surface processing method embodying the present invention blows submicron particles against the surface of a work to process the surface. Therefore, it is difficult to carry out the surface processing method by a conventional sandblasting apparatus, because the kinetic energy of the submicron particles blown by a conventional sandblasting apparatus is consumed for the agglomeration of the submicron particles instead of for the destruction of the surface of the work. Accordingly, the surface processing method of the present invention needs a surface processing apparatus capable of uniformly dispersing submicron particles in air in a mixing chamber and of steadily and continuously blowing the mixture of the submicron particles and air without clogging its piping with the submicron particles.

Prior to the description of the surface processing method, a surface processing apparatus for carrying out the surface processing method will be described with reference to FIGS. 1 and 2.

The surface processing apparatus for carrying out a surface processing method in a preferred embodiment according to the present invention comprises, as principal components, an air compressor 1 for supplying compressed air, a mixing tank 2 in which the compressed air discharged from the air compressor 1 and submicron particles are mixed, a blasting vessel 3 in which the mixture of the submicron particles and air is blown against a work, and an exhauster 4 for recovering the submicron particles from the blasting vessel 3 by sucking air from the blasting vessel 3.

An air supply pipe 5 has one end connected to the air compressor 1 and the other end branched into a first air supply pipe 6 and a second air supply pipe 7. The first air supply pipe 6 and the second air supply pipe are connected to the mixing tank 2. The air supply pipe 5 is provided with a pressure regulating valve 8 for regulating the pressure of the compressed air supplied to the mixing tank 2, and a solenoid valve 9 for controlling the supply of the compressed air to the mixing tank 2. The second air supply pipe 7 is provided with a flow regulating valve 10 for regulating the flow of the compressed air through the second air supply pipe 7.

A hopper 11 containing submicron particles is disposed on top of the mixing tank 2. The submicron particles are supplied to the hopper through an opening normally closed by a cover 12.

The hopper 11 has a funnelform bottom wall provided with a charging opening 11a in its central portion. The submicron particles are charged through the charging opening 11a into the mixing tank 2. A conical valve element 13 having a stem is fitted in the charging opening 11a. The stem of the valve element 13 extends through the central portion of the cover 12, and a stopper 13a is attached to the extremity of the stem of the valve element 13. A coil spring 14 is disposed between the stopper 13a and the cover 12 to bias the valve element 13 upward as viewed in FIG. 1 so that the circumference of the conical portion 13b of the valve element 13 is normally in close contact with the lower edge of the bottom wall of the hopper 11 to keep the charging opening 11a closed. When necessary, the valve element 13 is depressed against the resilience of the coil spring 14 to separate the conical portion 13b from the lower edge of the hopper 11 to open the charging opening 11a to let the submicron particles contained in the hopper 11 fall into the mixing tank 2.

The mixing tank 2 is a cylindrical vessel containing the submicron particles 15. The mixing tank 2 has a funnelform bottom wall provided at its lower end with a cermet filter disk 16, namely, a porous disk formed by sintering metal powder and having numerous small pores. The first air supply pipe 6 connected to the air compressor 1 is connected to the mixing tank 2 on the side of the backside of the filter disk 16 to supply the compressed air through the first air supply pipe 6 and the filter disk 16 into the mixing tank 2.

Figure 2:
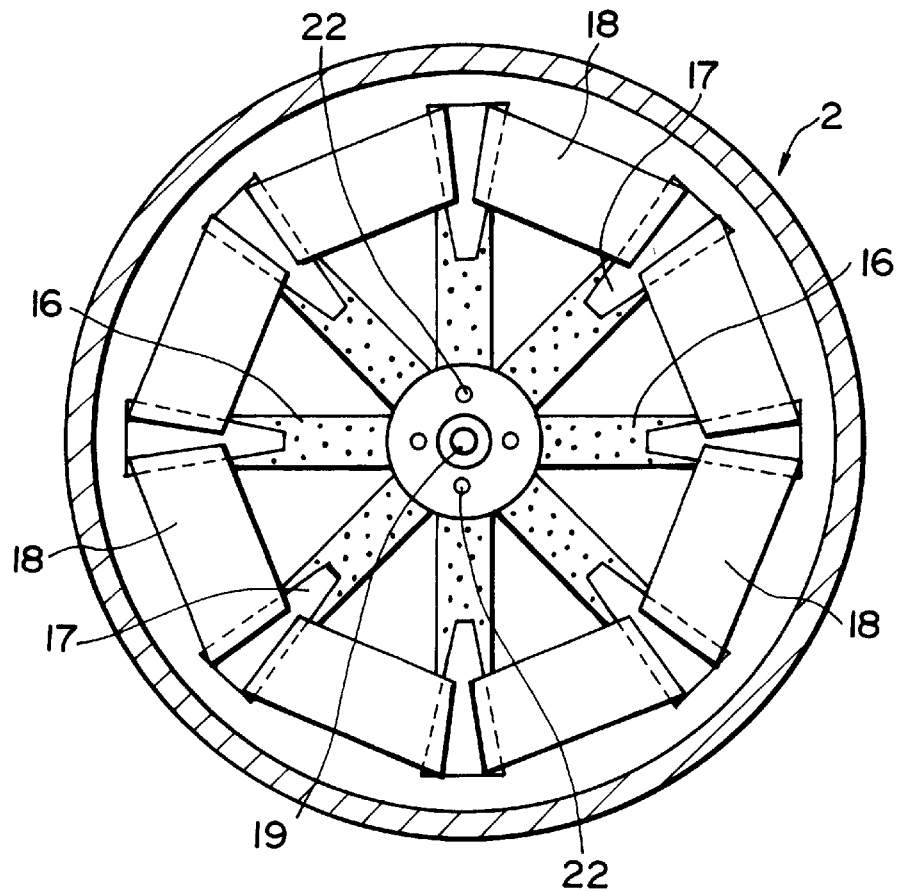
FIG. 2 is a plan view of the bottom of a mixing tank.

A plurality of vibrators 17 are arranged on a circle on the funnelform bottom wall of the mixing tank 2 with their free ends facing the upper side of the filter disk 16 as shown in FIG. 2. Each vibrator 17 is, for example, a bimorph device having a pair of piezoelectric elements and electrodes.

When an ac voltage is applied to the vibrators 17, the free ends of the vibrators 17 vibrates vertically to disperse the submicron particles 15 mechanically so that the submicron particles 15 and the compressed air supplied through the filter disk 16 into the mixing tank 2 are mixed. The frequency of the ac voltage applied to the vibrators 17 may be a high frequency in the range of 200 to 400 Hz. Desirably, the frequency of the ac voltage is approximately equal to the resonance frequency of the bimorph devices. Application of ac voltages of opposite phases to the adjacent vibrators 17 further enhances the effects of the vibrators 17.

The base ends of each vibrator 17 is covered with a rubber sheet 18 to prevent the submicron particles 15 from clogging the space under the vibrator 17 so that the vibration of the vibrator 17 is not obstructed.

A feed pipe 19 having one end opening into the mixing tank 2 is extended through the central portion of the filter disk 16 to send out the submicron particles stirred and dispensed by the compressed air from the mixing tank 2. The extremity 7a of the second air supply pipe 7 is inserted in the feed pipe 19 to suck the submicron particles 15 into the feed pipe 19 by the agency of a negative pressure produced by blowing the compressed air through the second air supply pipe 7, to mix the submicron particles 15 in the compressed air and to transport the submicron particles 15 by the compressed air. The feed pipe 19 is extended into the blasting vessel 3 and is provided at its extremity with a nozzle 20. A vibrator 21 provided on the feed pipe 19 prevents the submicron particles 15 from clogging the feed pipe 19.

The feed pipe 19 is a flexible tube, such as an urethane tube, a nylon tube or a vinyl tube. The feed pipe 19 is extended in a gentle curve without forming sharp bends. The pipe is formed so that steps are not formed in junctions so that air may not stagnated in the junctions and the submicron particles may not accumulate to clog the pipe.

Air jets 22 are formed in the bottom wall of the mixing tank 2 around the feed pipe 19. Part of the compressed air supplied through the first air supply pipe 6 is jetted through the air jets 22 to produce turbulent air currents around the open end 19*a* of the feed pipe 19 to stir the submicron particles 15 violently.

A stirring mechanism 24 is attached to the bottom surface of the valve element 13. The stirring mechanism 24 comprises a rotary shaft 23 journaled on the valve element 13, an arm 24*a* projecting from the rotary shaft 23, a frame 24*b* formed of a metal wire or the like, and a brush 24*c* attached to the lower end of the frame 24*b*. The rotary shaft 23 is driven for rotation to crush agglomerates of the submicron particles 15 in the mixing tank 2.

A particle collector 25 is disposed over the feed pipe 19 within the mixing tank 2. A particle collecting recess 25*a* of a trapezoidal cross section is formed in the bottom surface of the particle collector 25 opposite to the open end 19*a* of the feed pipe 19. The upper half portion of the particle collector 25 is formed in a filter 25*b* of a porous material. The filter 25*b* is connected to the exhauster 4 by a pipe 26. The pipe 26 is provided with a solenoid valve 27 and a flow control valve 28 to control the flow and flow rate of exhaust air through the pipe 26.

The exhauster 4 has a filter 29 and a suction fan 30. The suction fan 30 sucks air through the pipe 26 and the filter 29 from the mixing tank 2 and discharges the air through an air outlet 31 after purifying the air by the filter 29. The submicron particles arrested by the filter 29 are collected in a pit 32 formed under the filter 29.

Dehumidifying means 33, such as silica gel, and heating means 34, such as a heater, are provided in the upper portion of the interior of the mixing tank 2, and the heating elements of a heater 35 is wound round the mixing tank 2 to keep the submicron particles 15 dry within the mixing tank 2 so that the submicron particles 15 may not agglomerate.

The nozzle 20 attached to the extremity of the feed pipe 19 connected to the mixing tank 2 is held within the blasting vessel 3. A turntable 37 for supporting a work 36 is disposed opposite to the nozzle 20. The turntable 37 is meshed to prevent the unintended processing of portions, such as side surfaces, of the work 36 by the submicron particles rebounded by the turntable 37. The turntable is driven for rotation by a motor 38.

The turntable 37 is surrounded by the side wall of a suction funnel 39 to prevent the scatter of the submicron particles 15 in the blasting vessel 3. The scatter of the submicron particles 15 in the blasting vessel 3 allows the submicron particles 15 to escape outside the blasting vessel 3 when the door of the blasting vessel 3 is opened and reduces particle recovering efficiency.

The blasting vessel 3 also has a funnelform bottom wall. A return pipe 40 is connected to the bottom wall of the blasting vessel 3. The return pipe 40 is connected together with a return pipe 41 connected to the suction funnel 39 to the cover 12 of the hopper 11. Vibrating means 42, such as a bimorph, are provided on the bottom wall of the blasting vessel 3 to discharge the submicron particles 15 deposited over the inner surface of the bottom wall rapidly from the blasting vessel 3.

Also connected to the cover 12 is an exhaust pipe 43 connected together with the pipe 26 to the exhauster 4. An annular partition wall 44 extends downward from the inner surface of the cover 12. The partition wall 44 separates the submicron particles delivered through the return pipes 40 and 41 from air on the principle of a cyclone separator and classifies the submicron particles roughly, so that the submicron particles fall in the hopper 11. On the other hand the air separated from the submicron particles flows through the exhaust pipe 43 into the exhauster 4 and is discharged from the exhauster 4. A solenoid valve 45 is provided on the exhaust pipe 43 to control the flow of air.

In operation, the air compressor 1 discharges compressed air into the first air supply pipe 6 and the second air supply pipe 7. The compressed air discharged into the first supply pipe 6 flows through the filter disk 16 and the air jets 22 into the mixing tank 2 to stir the submicron particles 15 and, consequently, some of the submicron particles are collected around the open end 19*a* of the feed pipe 19 by the agency of the particle collecting recess 25*a* of the particle collector 25. The mechanical dispersion of the submicron particles by the vibrating means 17 maintains the stirring effect of the compressed air effectively. The solenoid valve 27 provided on the pipe 26 connected to the particle collector 25, and the solenoid valve 45 provided on the exhaust pipe 43 connected to the cover 12 of the hopper 11 are opened alternately at a fixed period. The pressure variation in the mixing tank 2 caused by the alternate opening of the solenoid valves 27 and 45 further enhances the stirring effect of the compressed air. When the flow rate of air flowing out from the mixing chamber 2 is reduced to a fixed value by operating the flow control valve 28, the range of pressure variation is narrowed, so that the submicron particles 15 is blown at a substantially fixed rate regardless of the alternate opening of the solenoid valves 27 and 45.

On the other hand, the compressed air discharged into the second air supply pipe 7 flows directly into the feed pipe 19 to produce a negative pressure in the feed pipe 19 and, consequently, the submicron particles 15 collected around the open end 19*a* of the feed pipe 19 are sucked into the feed pipe 19 and are mixed in the compressed air within the feed pipe 19.

Then, the mixture of the compressed air and the submicron particles flows through the feed pipe 19 and is blown through the nozzle 20 against the surface of the work 36.

The submicron particles blown into the blasting vessel 3 are returned through the return pipes 40 and 41 to the hopper 11 for recirculation.

The surfaces of works were processed by blowing the submicron particles against the surfaces at different angles of incidence of the submicron particles blown through the nozzle 20 against the surfaces of the works and the conditions of the thus processed surfaces were examined.

Figure 3:
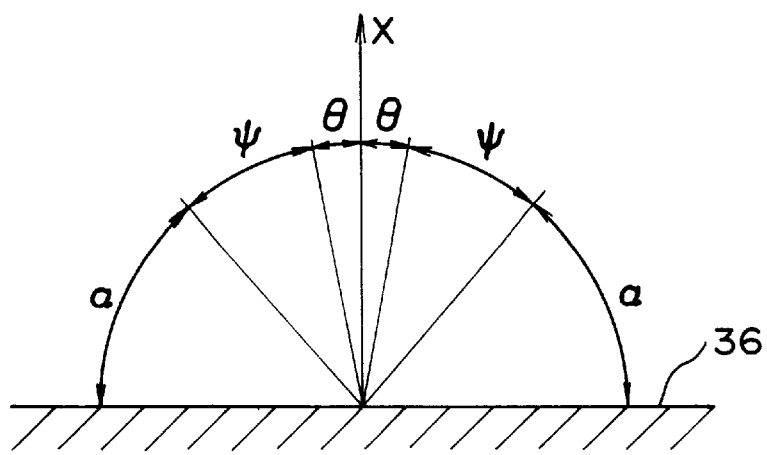
FIG. 3 is a diagram of assistance in explaining the incident angle of submicron particles.

The results of the examination showed that a thin film of the submicron particles is deposited over the surface of the work 36 when the incident angle, namely, the angle between the line of motion of the incident submicron particles and the direction (a direction of an arrow X in FIG. 3) of extension of the perpendicular to the surface at the point of incidence, is not greater than 10°, namely, an angle in a range indicated by θ in FIG. 3.

Figure 4:
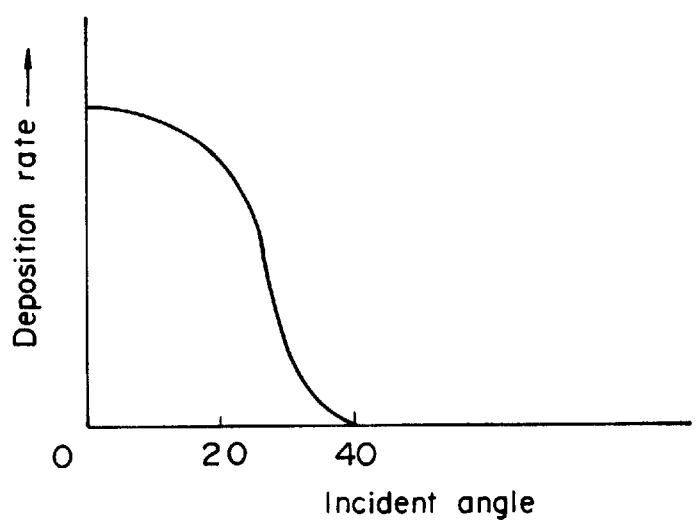
FIG. 4 is a graph showing the variation of deposition rate with incident angle.

FIG. 4 is a graph showing the variation of deposition rate with the incident angle. As is obvious from FIG. 4, the deposition rate decreases as the incident angle is increased and, eventually, the deposition rate reaches zero.

Figure 5:
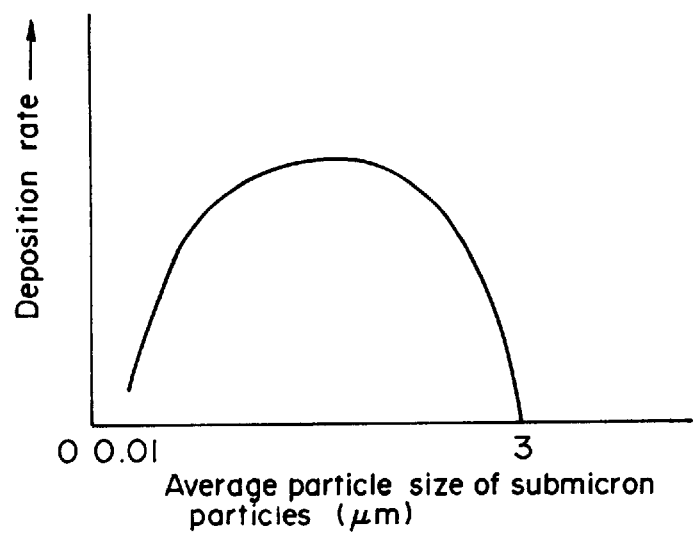
FIG. 5 is a graph showing the dependence of deposition rate on particle size.

The deposition of a thin film of the submicron particles is a phenomenon peculiar to submicron particles of a small average particle size. As shown in FIG. 5, only submicron particles of an average particle size not greater than 3 μm can be deposited in a thin film. The dependence of the film forming ability of submicron particles on the average particle size is effected slightly by the melting point of the submicron particles. Submicron particles having a higher melting point must have a smaller average particle size or the submicron particles are unable to be deposited in a thin film. The energy of submicron particles of an excessively small average particle size is insufficient for film deposition and, in the worst case, such submicron particles cannot be deposited. As is obvious from FIG. 5, the lower limit of the average particle size is about 0.01 μm.

Figure 6:
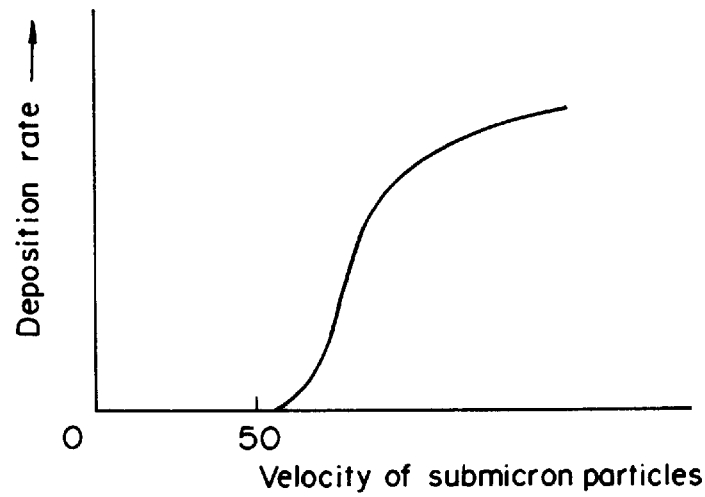
FIG. 6 is a graph showing the dependence of deposition rate on particle blowing velocity.

FIG. 6 is a graph showing the relation between the velocity of submicron particles and deposition rate. As is obvious from FIG. 6, submicron particles cannot be deposited unless the velocity thereof is higher than a certain value (50 m/sec) and the lower limit of velocity is higher for submicron particles having a higher melting point.

The results of examination showed also that when the incident angle is not less than 40° (an angle in a range indicated by α in FIG. 3), submicron particles are not deposited and the surface is etched.

Figure 7:
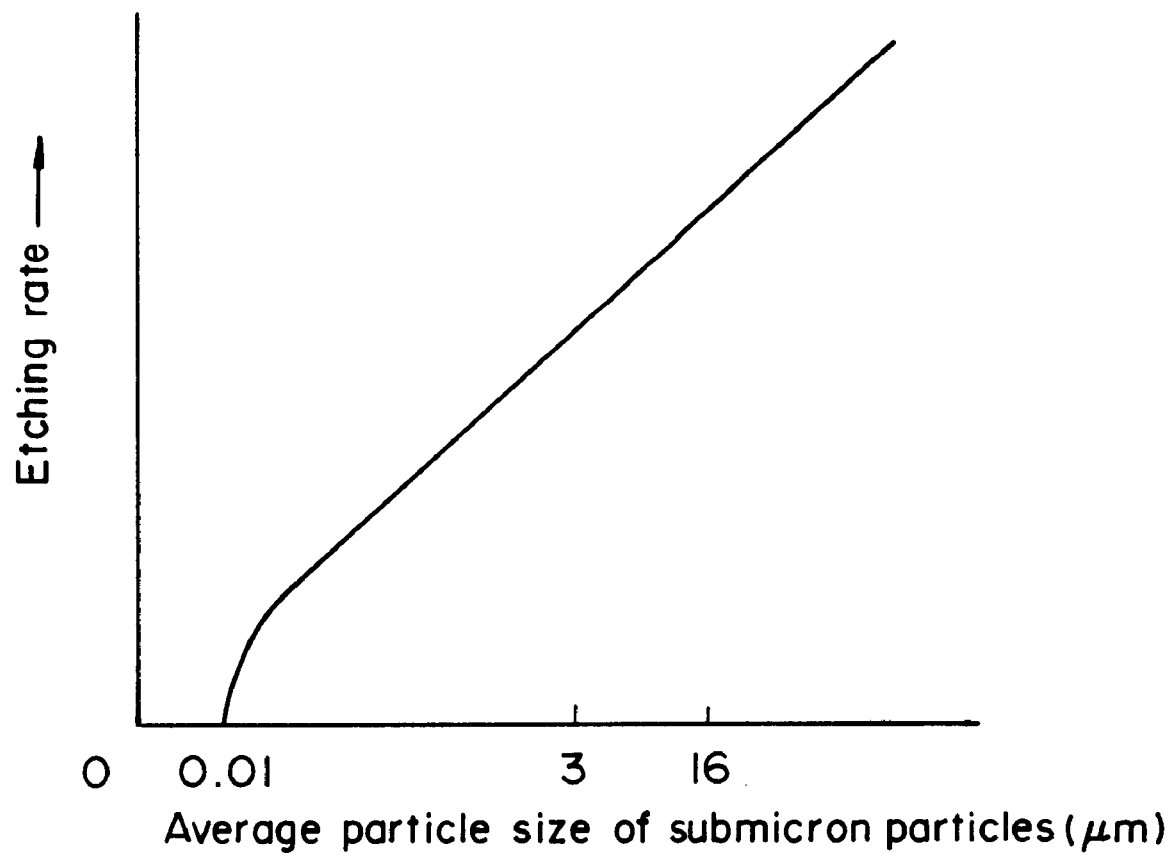
FIG. 7 is a graph showing the dependence of etching rate on particle size.

As shown in FIG. 7, etching rate increases with the average particle size of submicron particles. However, in view of the surface condition of the etched surface and etching accuracy, the average particle size of submicron particles must not exceed 3 μm.

The results of examination showed that etching and thin film deposition occur simultaneously when the incident angle is in an intermediate range (a range indicated by ψ in FIG. 3) between the range θ and the range α. Such a surface processing mode is advantageous in forming a thin film over the surface of a work after etching the surface.

Figure 8A:
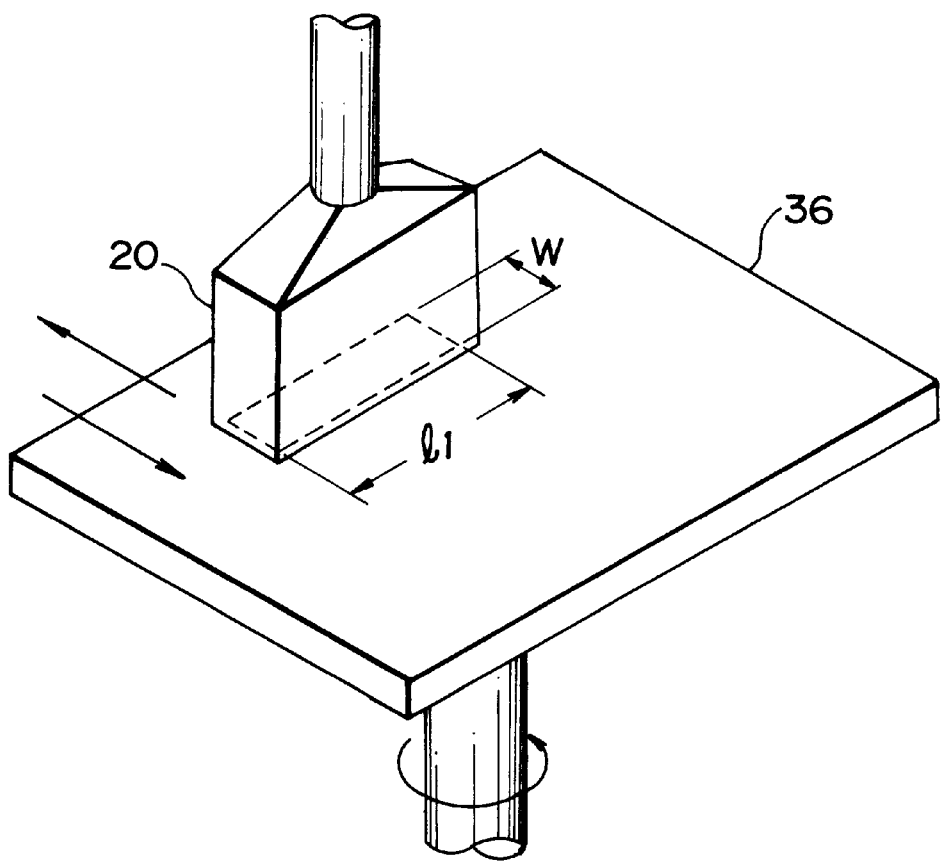
FIG. 8(A) is a perspective view of assistance in explaining the blasting operation of a nozzle.

In depositing a thin film over a surface having a relatively large area or etching the same surface, it is preferable to form the outlet of the nozzle 20 in a relatively wide slit as shown in FIG. 8(A) and to move the nozzle 20 along a straight line while the work 36 is rotated.

Figure 8B:
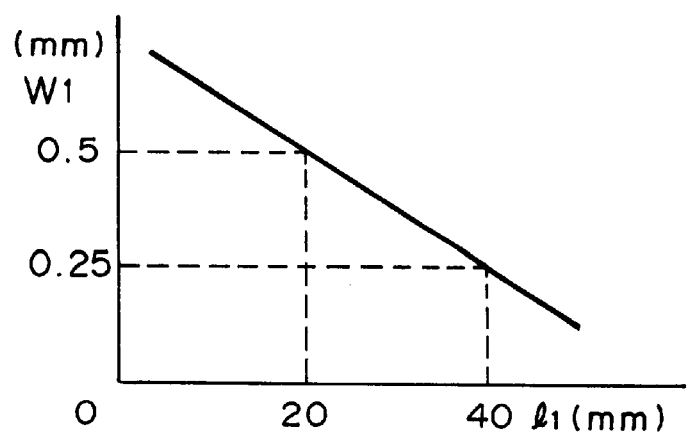
FIG. 8(B) is a graph showing an optimum relation between the width and length of the outlet opening of the nozzle.

The nozzle 20 is able to blow the mixture of compressed air and submicron particles satisfactorily when the width W and length $l_1$ of the outlet of the nozzle 20 meet a relation represented by a straight line shown in FIG. 8(B).

Preferably, a portion of a depth in the range of 2 to 10 mm from the extremity of the nozzle 20 of the inner circumference of the nozzle 20 has flat, straight surfaces substantially perpendicular to the surface of a work.

In processing a surface having a relatively large area, a plurality of nozzles may be used instead of moving the single nozzle 20 along a straight line.

It is also possible to move a nozzle having a small, round outlet in a direction perpendicular to a work feed direction.

The surface processing method was applied to practical film deposition and etching on the basis of the foregoing results of examination. Concrete examples of film deposition and etching processes will be described hereinafter.

EXAMPLE 1

Alumina submicron particles having an average particle size of 1.0 μm were prepared by crushing a sintered alumina block having a Vickers hardness of 1800 kg/cm².

The alumina submicron particles were blown at a velocity of 300 m/sec and at an incident angle of 0° for thirty seconds against the surface of a ferrite substrate having a Vickers hardness of 650 kg/cm² by the aforesaid surface processing apparatus provided with a nozzle having an outlet slit.

The particle concentration of the mixture of the compressed air and the alumina submicron particles blown against the surface of the ferrite substrate was about 0.1 g/cm³.

An alumina thin film of about 2.2 μm in thickness was deposited.

Figure 9:
FIG. 9 is a micrograph of alumina submicron particles taken by using an electron microscope.
Figure 10:
FIG. 10 is a micrograph taken by using an electron microscope, showing the crystal structure of a thin film formed by deposition.

FIG. 9 is a photograph of the alumina submicron particles taken by using an electron microscope and FIG. 10 is a photograph of the section of the deposited thin film taken by using an electron microscope.

As is obvious particularly from FIG. 10, the thin film is formed in a very dense construction in such a short time of thirty seconds, which proves the expected effect of the surface processing method.

EXAMPLE 2

Alumina submicron particles of an average particle size of 0.6 μm were blown against the surface of a ferrite substrate under the same surface processing conditions as those employed for Example 1. A dense alumina thin film was formed.

A dense alumina thin film was formed also by using alumina submicron particles of an average particle size of 0.2 μm.

Comparable Example 1

Alumina submicron particles of an average particle size of 5 μm were blown against the surface of a ferrite substrate under the same surface processing conditions as employed in Example 1. The alumina submicron particles were not deposited at all and the surface of the ferrite substrate was etched.

EXAMPLE 3

Alumina submicron particles of an average particle size of 0.6 μm were blown against the surface of a ferrite substrate for etching.

Surface processing conditions were the same as those employed in Example 1, except that the incident angle was 40°.

The width of lines forming a pattern to be formed by etching was 50 µm. A Photosensitive urethane rubber film of 5 µm in thickness was used as an etching resist.

During the etching process, the ferrite substrate was rotated at 30 rpm. The alumina submicron particles were blown for sixty seconds.

The surface of the ferrite substrate was etched by a depth of 2 µm, the inclination of the side surfaces of the lines of the pattern was about 60°, and the etched portions were mirror-finished in a surface roughness $R_{max}$ of 0.06 µm.

EXAMPLE 4

Alumina submicron particles of an average particle size of 1.0 µm were blown for ten seconds against the circumference of a cylindrical metal mold formed of a hard stainless steel while the metal mold was rotated at a high rotating speed.

Surface processing conditions were the same as those employed in Example 3.

The circumference of the metal mold was etched in a surface roughness $R_{max}$ of 0.05 µm.

Comparable Example 2

The circumference of a metal mold was etched under the same surface processing conditions as those employed in Example 4, except that alumina submicron particles of an average particle size of 6 µm were used.

The circumference of the metal mold was etched in a surface roughness $R_{max}$ of 0.07 µm.

As is apparent from the foregoing description, the present invention using submicron particles of an average particle size not greater than 3 µm exceeds the prior art in ability of film deposition or etching.

Particularly, the present invention is capable of depositing a film at a very high deposition rate and is subject to less restrictions on surface conditions.

The present invention is capable of accurately etching the surface of a work in a minute pattern at a high etching rate and of finishing an etched surface substantially in a mirror-finished surface.

We claim as our invention:

1. A surface processing method comprising the steps of providing a workpiece having a surface to be processed; forming a carrier gas stream containing submicron particles having an average particle size in the range of between 0.01 and 3.0 µm, said particles being of a material with a hardness greater than a hardness of the surface of the workpiece; and then blowing said carrier gas stream at a velocity not less than 50 m/sec against the surface of the workpiece with an incident angle to a perpendicular of said surface being less than 40° to cause deposition of a layer of the material of said particles.

2. A surface processing method according to claim 1, said incident angle is not more than 10°.

3. A surface processing method according to claim 1, wherein said incident angle is greater than 10°.

* * * * *